United States Patent [19]

Belart

[11] 3,999,808
[45] Dec. 28, 1976

[54] BRAKE SYSTEM WITH ANTISKID CONTROL

[75] Inventor: Juan Belart, Walldorf, Germany

[73] Assignee: ITT Industries, Inc., New York, N.Y.

[22] Filed: Sept. 4, 1975

[21] Appl. No.: 610,341

[30] Foreign Application Priority Data

Sept. 11, 1974 Germany ............................ 2443545

[52] U.S. Cl. ................................. 303/92; 303/116
[51] Int. Cl.² ........................................... B60T 8/06
[58] Field of Search ......... 60/581, 582; 188/181 A, 188/345; 303/10, 21 A, 21 AF, 21 F, 92, 116

[56] References Cited

UNITED STATES PATENTS

| 3,827,759 | 8/1974 | Belart ............................ | 303/21 AF X |
| 3,870,377 | 3/1975 | Belart et al. .................. | 303/21 AF X |
| 3,910,645 | 10/1975 | Takeuchi et al. ........... | 303/21 AF X |

Primary Examiner—Duane A. Reger
Attorney, Agent, or Firm—John T. O'Halloran; Alfred C. Hill

[57] ABSTRACT

The brake system includes a master cylinder having a master-cylinder piston slidable in a working chamber, a power source and a pressure-control valve disposed in axial alignment with the piston. The pressurized fluid of the power source controlled by the control valve is directed to the wheel brake cylinders via the working chamber without displacement of the piston. This arrangement makes it possible to operate the wheel brake cylinders by the power source without actuating the piston. The piston is actuated only if the power source fails. An antiskid control system is disposed in the hydraulic lines between the working chamber and the wheel brake cylinders. A hydraulic valve arrangement is disposed in return lines from the antiskid control system to an unpressurized reservoir to deactivate the antiskid control system when the power source fails.

16 Claims, 3 Drawing Figures

BRAKE SYSTEM WITH ANTISKID CONTROL

BACKGROUND OF THE INVENTION

This invention relates to a full power braking system with an antiskid control comprising a master cylinder having a master-cylinder piston slidable in a work chamber in response to brake-pedal depression, a power source, a pressure-control valve disposed in the master cylinder for connecting the power source with the wheel brake cylinders in response to the pedal force applied, or for generating a pressure in a line connecting the wheel cylinders with the fluid source by throttling a fluid flow with an antiskid control provided in the line connecting the wheel cylinders with the power source. Such a brake system is known from the German unexamined and printed patent application DT-OS No. 2,017,185.

If there is danger of wheel lock, pressure will be reduced in that brake or brake circuit in which such danger exists. For this purpose, the brake cylinder or the brake circuit concerned is disconnected from the master cylinder, and pressure fluid will then be taken from the brake cylinder or the brake circuit until the pressure has decreased sufficiently.

This type of control necessitates no elaborate design if the brake circuit to be controlled is sufficiently provided with pressure fluid from a power source. In order to build up pressure again after the danger of wheel lock is over, the power source is able to supply the brake cylinders or the brake circuit again with the amount of fluid drawn therefrom for reducing the pressure without requiring further depression of the brake pedal. To give an example of the state of the art, reference is made to the German unexamined and printed patent application DT-OS No. 2,017,185 mentioned above. The brake system as disclosed in this prior publication has two brake circuits. The brake circuit which is associated with the rear-wheel brakes receives its pressure fluid from a pump serving as the power source. The pump is able to feed the pressure fluid that has been removed for effecting the antiskid control back into the brake system without affecting the position of the brake pedal.

By displacing a master-cylinder piston, pressure fluid is forced into the brake circuit associated with the front-wheel brakes. The master-cylinder piston is displaced by depressing the brake pedal. If pressure fluid were drawn from this brake circuit, this could be made up for only by further depression of the brake pedal. After pressure had been reduced several times by removing pressure fluid, the pedal travel would be at its maximum and the brake could not be actuated any longer.

Therefore, if it is desired to effect an antiskid control in a brake circuit into which pressure fluid is fed by a master-cylinder piston only, additional steps have to be taken to return the pressure fluid withdrawn for reducing the pressure to the brake cylinder or the brake circuit concerned to achieve renewed pressure build-up. This can be achieved by a displacement piston which is movable against a strong spring by means of an energy, thereby providing a space for receiving the pressure fluid to be withdrawn from the brake cylinders or the brake circuit. In order to achieve renewed pressure build-up or in the event of failure of the energy source which causes movement of the displacement piston, the strong spring will urge the displacement piston back into its initial position, thereby urging the pressure fluid received back into the brake circuit. To give an example of such an antiskid control, reference is made to U.S. Pat. No. 3,684,328.

This U.S. patent shows that an antiskid control is simple in design if it is to be effected in a brake circuit supplied with energy from the power source to a sufficient degree. However, the antiskid control is expensive and complicated in a brake circuit which is supplied with energy only by a master cylinder by means of displacing a master-cylinder piston because in that case the supply of energy is limited by the maximum possible pedal travel.

For reasons of safety, dual-circuit brake systems are often used. From the point of view of costs, this permits a good compromise to be achieved as is shown by the German unexamined and printed patent application DT-OS No. 2,017,185 already mentioned hereinabove. In this brake system, one circuit receives its energy from a pump directly, whereas the other circuit is supplied by a master-cylinder piston. This permits a simple antiskid control to be provided in the brake circuit supplied by the pump. The other brake circuit which is intended for the front wheels of the vehicle is not equipped with the antiskid control since this would be a very complicated procedure and wheel lock at the front wheels is not as hazardous as at the rear wheels. The particular advantage of this prior known arrangement lies in that the front wheel brakes can be actuated by the master-cylinder piston if the pump has failed.

SUMMARY OF THE INVENTION

It is the object of the present invention to provide a brake system of the type initially referred to hereinabove which permits both an antiskid control to be effected for all the brake circuits without much effort and, in the event of failure of the power system, an actuation of the brake using exclusively the pedal force applied by the vehicle operator.

According to the present invention, this is achieved in that the connection between the power source and the wheel cylinders is established via the master-cylinder work chamber alone, and in that means are provided for interrupting the connection between the master cylinder and the power source when the master-cylinder piston is displaced in the actuating direction.

A feature of the present invention is the provision of a full power braking system with an antiskid control comprising: a master cylinder including a housing having a longitudinal axis, a first working chamber disposed in the housing coaxial of the axis, a first piston coaxial of the axis slidable in the first working chamber in response to a brake pedal depression; a power source coupled to the master cylinder; wheel brake cylinders coupled to the first working chamber; a pressure-control valve disposed in the master cylinder coaxial of the axis associated with the power source to control fluid from the power to actuate the wheel brake cylinders from the first working chamber without displacing the first piston; an antiskid control system disposed between the first working chamber and the wheel brake cylinder; and a device in the master cylinder to interrupt a connection between the first working chamber and the power source when the first piston is displaced in the actuating direction upon failure of the power source.

With regard to this solution, it has to be mentioned that a brake system is known from U.S. Pat. No.

3,639,008 wherein the brake is actuated by pressure fluid introduced from a power source by actuating a pressure-control valve, and wherein a master cylinder is provided additionally permitting an emergency braking if the power source has failed. However, this brake system is not provided for use with an antiskid control. The present invention is based on the realization that an antiskid control becomes simple if a brake circuit is normally actuted by a power source and if pressure is built up by a master cylinder only when the power source has failed. The unitization of master cylinder and pressure-control valve according to the U.S. Pat. No. 3,639,008 results in a surprisingly simple brake system affording surprising advantages.

The particular advantages of the present invention lie in that it may be designed both as an accumulator and as a pump circulation system. Further, it is possible to provide several brake circuits without departing from the spirit of this invention and without necessitating excessive effort. In this case, antiskid controls of the most simple type may be provided in all brake circuits. Also, an important feature of the inventive brake system is that the master-cylinder piston need not generate pressure when the brake system is activated with the power source intact. This permits the piston diameter to be designed such that sufficiently high pressure can be built up using the maximum possible pedal travel if the power source has failed.

In a particular embodiment of the invention, the master-cylinder piston has an annular chamber which is disposed between a sleeve seal closest to the work chamber and another seal closest to the pedal and can be connected with the power source via the pressure-control valve, with a fluid connection being provided between said annular chamber and the work chamber of the master-cylinder piston through longitudinal bores in the master-cylinder piston past the outer periphery of the sleeve seal. Such an arrangement makes use of the effect of the sleeve seal in its capacity as a check valve. If the power source fails due to a defect and the master-cylinder piston is displaced by the brake pedal directly, the pressure developed in the master-cylinder work chamber will cause the sleeve seal to rest against the wall of the master cylinder, thereby automatically closing the connection between the work chamber and the power source.

In another embodiment of the invention, the pressure-control valve consists of a valve spool rigidly connected with a brake pedal and of a control casing slidable in the actuating direction of the brake system in the master cylinder by the pressure applied against the force of a simulator spring.

By virtue of this method, a brake-pedal responsive travel is provided by actuating the brake system using the power source. This affords an improvement in that the vehicle operator will be able to regulate the brake effect more accurately, thereby providing a better "brake feel".

When designing the brake system as a multi-circuit brake, an advantage is obtained by providing a pressure chamber defined between the control casing and a master-cylinder end wall closest to the brake pedal, with a longitudinal channel in the master-cylinder housing connecting the pressure chamber with the annular chamber of the master-cylinder piston, and by employing the pressure-control valve for introducing pressure from the power source into the work chamber via the longitudinal channel. In order to design the brake system as a dual-circuit brake system, this arrangement requires merely a second master-cylinder piston having similarly an annular chamber in the master cylinder. In this case, the longitudinal channel has to be extended up to the annular chamber of the second master-cylinder piston.

In a further embodiment of the present invention, the master-cylinder piston closest to the pedal is designed as a stepped piston and the annular chamber has on the side closest to the brake pedal an actuation surface larger than on the side closest to the sleeve seal and, on the side closest to the pedal, rests against a stop of the master-cylinder housing, with a simulator spring bearing against the master-cylinder piston. In this manner, the simulator spring has a stop which is formed only when energy from the power source is available. If the power source fails due to a defect, depression of the brake pedal will cause the master-cylinder piston to be displaced axially, with the stop following this movement. In this manner, the force of the simulator spring need not be overcome for brake actuation. The simulator spring can be readily displaced in the master cylinder without requiring any energy.

If a master-cylinder piston is used consisting of two pistons of different diameters, with the pistons being anchored to one another as is conventional practice in stepped master cylinders, this results advantageously in only a slightly larger pedal travel when a circuit has failed and when the brake is actuated without the power source.

In the present inventive brake system, the aim is to provide deactivation of the antiskid control when the power source has failed. Otherwise, if there is danger of wheel lock, pressure fluid might be drawn from the brake circuits and cause exhaustion of the pedal travel. For this purpose, the present invention provides a hydraulic valve arrangement which cuts off the return line of the antiskid control when the power source has failed.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
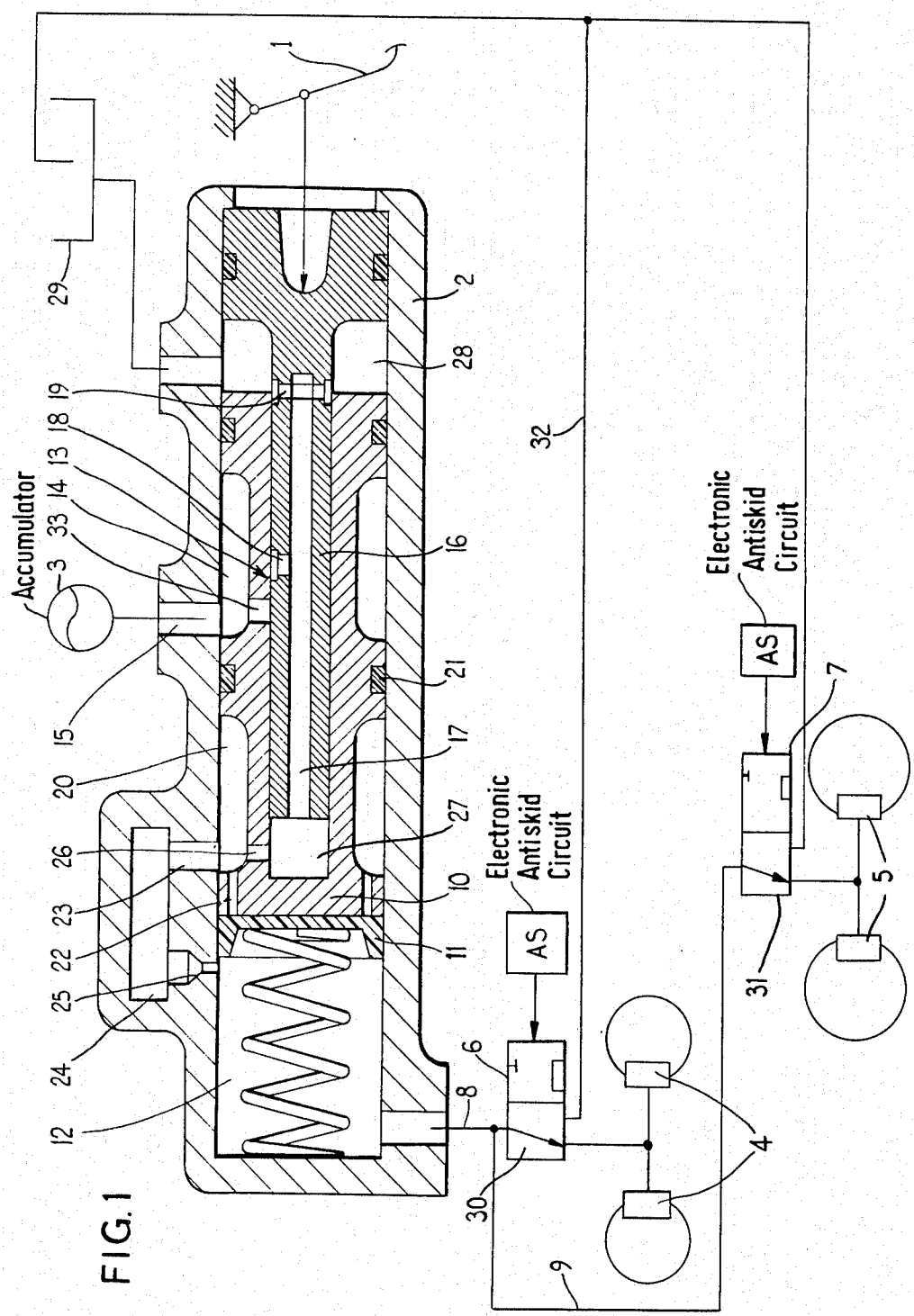
FIG. 1 is a longitudinal cross-section of the brake system constructed in accordance with the principles of the present invention utilizing an accumulator as a power source.

FIG. 1 shows, schematically, the brake system embodying the present invention. It substantially comprises a brake pedal 1, a master cylinder 2, a power source 3 in the form of an accumulator, front-wheel brake cylinders 4, rear-wheel brake cylinders 5 and antiskid control units 6 and 7 which are inserted into brake lines 8 and 9 leading to the wheel cylinders 4 and 5.

The master cylinder 2 conventionally has a master-cylinder piston 10 with a sleeve seal 11. The master-cylinder piston 10 is axially slidable in a work chamber 12 of the master cylinder 2 so that pressure fluid is allowed to be introduced from chamber 12 into the front and rear-wheel brake cylinders 4 and 5 via brake lines 8 and 9.

A pressure-control valve 13 is used for the control of pressure fluid introduced from power source 3 into the wheel brake cylinders 4 and 5. Pressure-control valve 13 is provided in the master-cylinder piston 10. For this purpose, the master-cylinder piston 10 forms at the same time a control casing for pressure-control valve 13. Piston 10 has a pressure chamber 14 which permanently communicates with power source 3 via a bore 15. A valve spool 16 is guided in master-cylinder piston 10 and rigidly connected with brake pedal 1. A longitudinal passage bore 17 and cross or transverse bores 18 and 19 are disposed in valve spool 16 such that the desired control function will be executed which will be explained later in this description.

Master-cylinder piston 10 further has an annular chamber 20 provided between sleeve seal 11 and a seal 21 disposed on the side closest to the brake pedal. Seal 21 separates annular chamber 20 from pressure chamber 14 which permanently connects with power source 3. From annular chamber 20, longitudinal bores 22 lead to sleeve seal 11.

Further, annular chamber 20 connects with a reservoir 24 via a bore 23. Reservoir 24 is pressure-tight relative to the outside. A compensating bore 25 conventionally leads into work chamber 12 directly in front of sleeve seal 11. In the inoperative state of the brake system, annular chamber 20 further connects with an unpressurized reservoir 29 via a cross or transverse bore 26, a chamber 27 in front of valve spool 16 in master-cylinder piston 10, longitudinal passage bore 17 in valve spool 16, and a pressure chamber 28 on the side closest to the brake pedal behind master-cylinder piston 10.

The schematically represented antiskid control units 6 and 7 include a pilot valve 30 and 31, respectively. As long as there is no danger of wheel lock, pressure fluid will be fed from work chamber 12 directly via pilot valves 30 and 31 to wheel brake cylinders 4 and 5. If, for example, the brakes associated to wheel brake cylinders 4 tend to cause locking, pilot valve 30 will change its position due to the arrival of an electric lock signal from the electronic portion of an antiskid system AS, receiving input signals from a speed sensor at each wheel, thereby inhibiting the connection between wheel brake cylinders 4 and work chamber 12. Simultaneously, wheel brake cylinders 4 will be connected with the unpressurized reservoir 29 via a line 32. In this manner, pressure in wheel brake cylinders 4 will be allowed to decrease. Pilot valve 31 associated with wheel brake cylinder 5 will operate in a similar manner. This is naturally a very simplified form of antiskid control. In practice, phases for maintaining a constant pressure and phases for rapid or slow pressure increase or decrease will be provided.

The operation of the brake system of FIG. 1 as described herein is as follows. First, it shall be assumed that power source 3 is fully operative. Depression of brake pedal 1 will cause valve spool 16 to be shifted to the left when viewing the drawing, thereby moving the cross bores 19 into master-cylinder piston 10 which is designed as a control casing, and, thus, first interrupts the connection between work chamber 12 and unpressurized reservoir 29 via compensating bore 25, reservoir 24, bore 23, cross bore 26, chamber 27, passage bore 17 and fluid chamber 28. Thereupon, cross bore 18 will overlap with the fluid bore 33 so that fluid will flow from the power source 3 into chamber 27 via bore 15, pressure chamber 14, fluid bore 33, cross bore 18 and passage bore 17. From chamber 27, fluid will flow into annular chamber 20 via cross bore 26. Since annular chamber 20 communicates with the rear side of sleeve seal 11 via longitudinal bores 22, fluid is thereby allowed to flow past sleeve seal 11 to reach work chamber 12 wherefrom it will be introduced in a conventional manner into wheel brake cylinders 4 and 5 via brake lines 8 and 9. Thus, the brake will be actuated without requiring movement of master-cylinder piston 10. The fluid withdrawn at the time of an antiskid control can be compensated for at any time by power source 3 in the manner previously described.

If power source 3 fails due to a defect, the brake can be actuated as before by the force of the operator acting on brake pedal 1. In this case, valve spool 16 first moves into master-cylinder piston 10 until it rests against the latter in chamber 27. Then, master-cylinder piston 10 is displaced. Sleeve seal 11 overtravels in a conventional manner compensating bore 25. By virtue of the pressure building up in work chamber 12, sleeve seal 11 will rest against the wall of the work chamber 12, thereby sealing the latter from power source 3. As is conventional practice in a master-cylinder, fluid will be fed to wheel brake cylinders 4 and 5 from work chamber 12.

Figure 2:
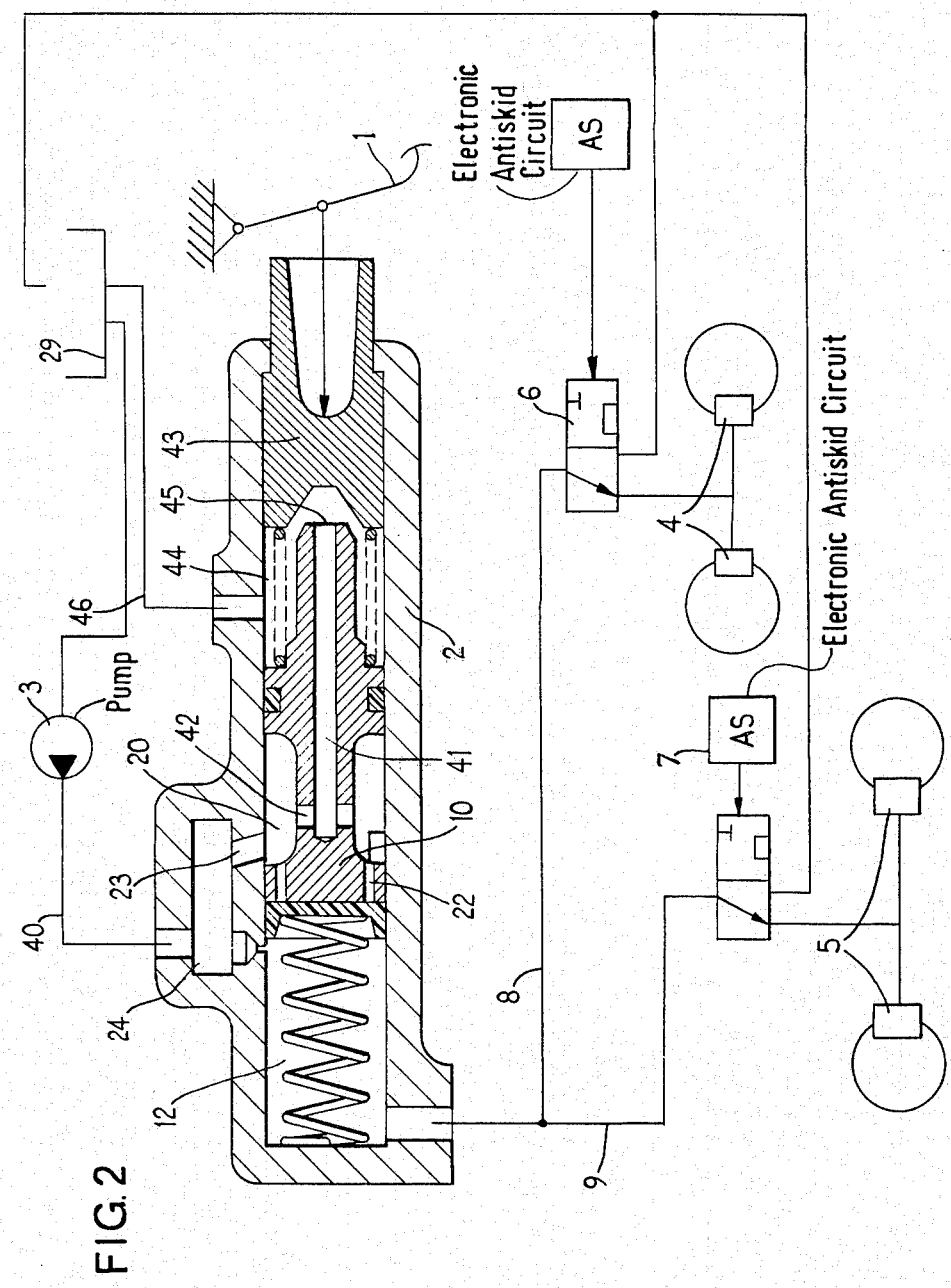
FIG. 2 is a longitudinal cross-section of the brake system constructed in accordance with the principles of the present invention utilizing a pump-circulation system as the power source.

In the embodiment of FIG. 2, like parts have been assigned the same reference numerals as in FIG. 1. Exactly similar to the embodiment described with respect to FIG. 1, the brake system includes brake pedal 1, master-cylinder 2, power source 3 and wheel brake cylinders 4 and 5. In this embodiment, however, the power source 3 is not an accumulator, but a pump.

Antiskid control units 6 and 7 inserted into lines 8 and 9 fully correspond to those described in the embodiment of FIG. 1.

Again, master-cylinder 2 has a reservoir 24. Power source 3 is so connected that it is able to permanently introduce pressure fluid into reservoir 24 via a line 40. Reservoir 24 in turn connects with annular chamber 20 via bore 23. A longitudinal bore 41 is provided in master-cylinder piston 10, with cross or transverse bores 42 extending from bore 41 into annular chamber 20.

The brake pedal 1 is connected to a throttle member 43 which is sealingly slidable in master-cylinder 2 behind master-cylinder piston 10. This provides a fluid chamber 44 between master-cylinder piston 10 and throttle member 43. Fluid chamber 44 connects with unpressurized reservoir 29. Longitudinal bore 41 in master-cylinder piston 10 has an outlet port 45 which can be blocked by the approach of throttle member 43.

The operation of the brake system constructed in accordance with this embodiment is as follows. Assume first that power source 3 is available. As long as the brake is not actuated, fluid is permanently introduced into annular chamber 20 via line 40, reservoir 24 and bore 23. From chamber 20, fluid will flow, via cross bore 42 and longitudianl bore 41, into fluid chamber 44 and then returned to reservoir 29 via the line 46. Depression of brake pedal 1 will cause throttle member 43 to approach outlet port 45, thereby throttline the flow of fluid. Pressure will be built up from power source 3 up to outlet port 45. This will cause pressure to build up also in annular chamber 20 and further in longitudinal bores 22 and work chamber 12. Fluid can permanently be introduced into work chamber 12 and therefrom to wheel brake cylinders 4 and 5.

If power source 3 fails, brake pedal 1 has to be depressed only until throttle member 43 is seated on outlet port 45 of master-cylinder piston 10. Thereupon, master-cylinder piston 10 can be displaced as is usual with master cylinders, thereby allowing fluid to flow from work chamber 12 to wheel brake cylinders 4 and 5. It is to be understood that master-cylinder piston 10 is not moved while the brake system is activated by means of power source 3. Piston 10 is moved to displace fluid only in such cases where power source 3 has failed.

Figure 3:
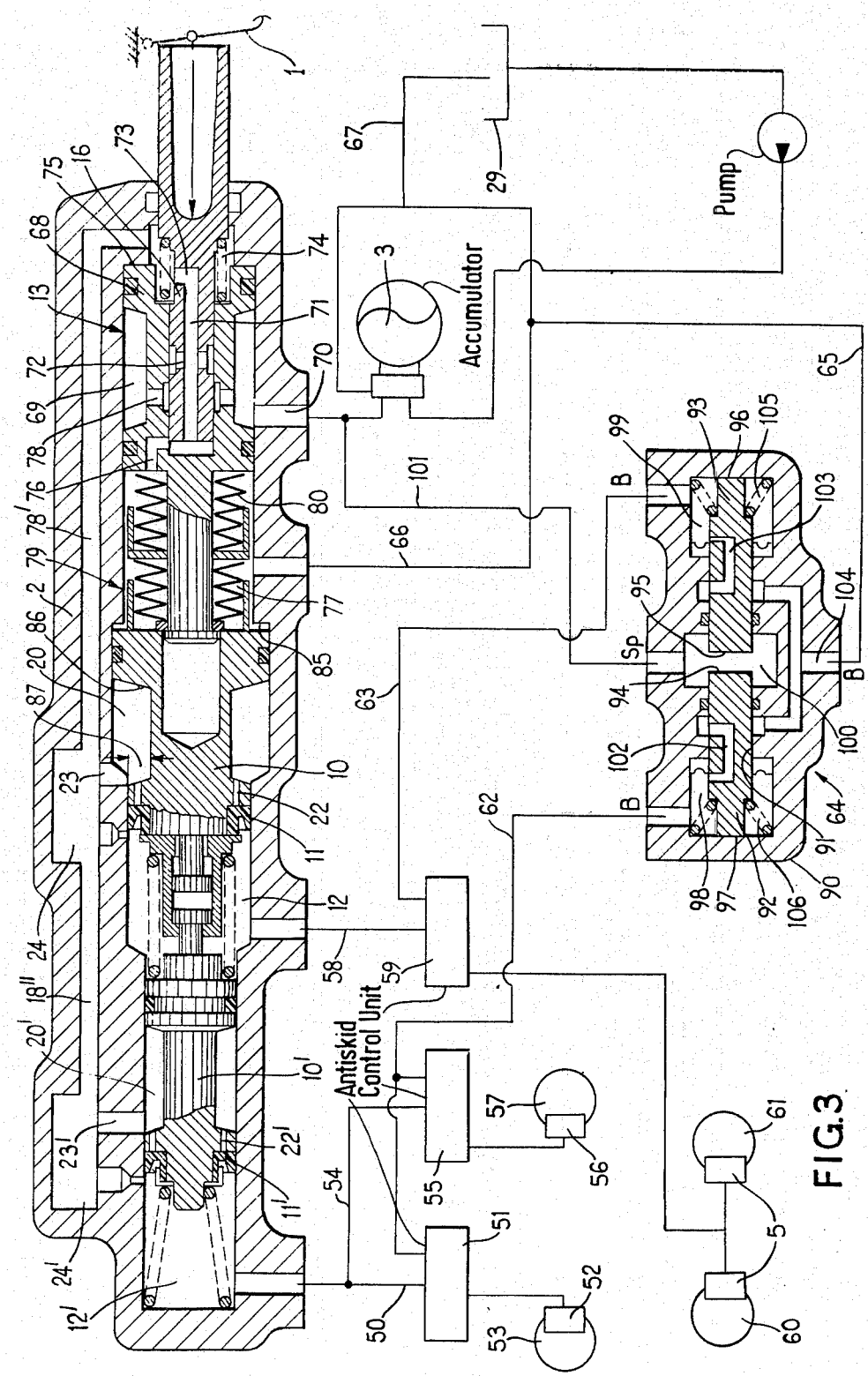
FIG. 3 is a longitudinal cross-section of the brake system constructed in accordance with the principles of the present invention having a dual-circuit master cylinder and a hydraulic arrangement for de-energizing the antiskid control when the power source has failed.

In the embodiment of FIG. 3, like parts have been assigned the same reference numerals as in FIGS. 1 and 2. The brake system according to the embodiment of FIG. 3 uses an accumulator as power source 3. In master-cylinder 2, master-cylinder piston 10 is connected to a second master-cylinder piston 10' having a smaller diameter. The master-cylinder pistons 10 and 10' are anchored to one another as is the case with stepped master cylinders for use in dual-circuit hydraulic brake systems as has been described for instance in U.S. Pat. No. 3,488,959.

The use of two master-cylinder pistons 10 and 10' also causes two work chambers 12 and 12' to be provided in master cylinder 2. From work chamber 12', a fluid line 50 leads to a wheel brake cylinder 52 of a front-wheel brake 53 via an antiskid control unit 51. A line 54 leads to a wheel brake cylinder 56 of a front-wheel brake 57 via an associated antiskid control unit 55. A line 58 connects work chamber 12 of master-cylinder piston 10 with the two wheel brake cylinders 5 of the rear-wheel brakes 60 and 61 via on antiskid control unit 59. Fluid drawn from the individual brake circuits for effecting the antiskid control is fed, via lines 62 and 63, to a hydraulic locking arrangement 64 and further via lines 65, 66 and 67, to unpressurized reservoir 29. Antiskid control units 51, 55 and 59 are implemented as described hereinabove with respect to FIG. 1.

The pressure-control valve 13 shall now be described in greater detail, said valve providing for control fluid flow from power source 3 into wheel cylinders 52, 56 and 5 when brake pedal 1 is despressed. Pressure-control valve 13 includes a control casing 68 which is axially sealingly slidable in master cylinder 2. Control casing 68 has an annular chamber 69 which permanently communicates with power source 3 via a bore 70. In control casing 68, a valve spool 16 is provided axially slidable and rigidly connected with brake pedal 1. Valve spool 16 has a longitudinal bore 71 and cross or transverse bores 72 and 73. Via longitudianl bore 71 and a channel 76, a chamber 74 disposed between a pedal-side end wall 75 of control casing 68 and the pedal-side end wall of master-cylinder 2 connects with a chamber 77. Chamber 77 permanently connects with unpressurized reservoir 29 via lines 66 and 67. Cross bores 72 and 73 in valve spool 16 are so designed to first interrupt the connection between the two chambers 74 and 77 when valve spool 16 is displaced in the actuating direction. Thereupon, fluid is allowed to flow into chamber 74 from annular chamber 69, via a bore 78, cross bore 72 and longitudinal bore 71.

From chamber 74, a longitudinal channel 78' leads to the reservoir 24. The master cylinder being a dual-circuit master cylinder, a second reservoir 24' is provided which communicates, via a longitudinal channel 78'', with the first reservoir 24 and consequently with longitudinal channel 78'. Similar to master-cylinder pistons 10 of the two preceding embodiments, each of the two-master-cylinder pistons 10 and 10' has an annular chamber 20 and 20', respectively, connecting via respective bore 23 and 23' with reservoir 24 and 24', respectively.

In order to provide a pedal travel responsive to the pressure applied to the wheel cylinders when activating the inventive brake system and utilizing the power source, a travel simulator 79 is inserted between control casing 68 and master-cylinder piston 10. Travel simulator 79 includes a simulator spring 80 bearing with one end against valve spool 16, while its other end rests against master-cylinder piston 10. For this purpose, master-cylinder piston 10 is designed as a stepped piston. It rests in its inoperative position against a stop 85 of master cylinder 2, stop 85 being secured to the housing and disposed on the side closest to brake pedal 1. From the design of master-cylinder piston 10 as a stepped piston it ensues that annular chamber 20 of the pedal-side master-cylinder piston 10 has in the direction of brake pedal 1 an actuating surface 86 which is larger than the actuating surface 87 of annular chamber 20 in the actuating direction of master cylinder 2. Therefore, when annular chamber 20 receives the pressurized fluid, master-cylinder piston 10 closest to brake pedal 1 will always be held against stop 85. In this manner, master-cylinder piston 10 closest to brake pedal 1 can serve as a stationary stop for simulator spring 80. It has to be noted further that simulator spring 80 is understood to be anchored to valve spool 16.

The individual members of the brake system of FIG. 3 so far described operate as follows. Assume first that power source 3 is available for actuating the brake. Depression of brake pedal 1 will cause valve spool 16 to move into control casing 68. This closes first channel 76, thereby shutting off the connection established via longitudinal bore 71 between chamber 74 and unpressurized chamber 77 connecting with unpressurized reservoir 29. Upon further displacement of valve spool 16 in the actuating direction, cross bore 72 overlaps with cross bore 78, thereby allowing fluid to flow from annular chamber 69 into chamber 74 via cross bore 78, cross bore 72 and longitudinal bore 71. From chamber 74, fluid will flow into reservoirs 24 and 24' via the longitudinal channels 78' and 78''. Similar to the two first-mentioned embodiments, fluid will flow from reservoirs 24 and 24' into work chambers 12 and 12' via annular chambers 20 and 20', longitudinal bores 22 and 22' in master-cylinder pistons 10 and 10', and past sleeve seals 11 and 11'. From chambers 12 and 12', there is a connection to wheel brake cylinders 52, 56 and 5 via antiskid control units 51, 55 and 59.

Since chamber 77 is unpressurized and chamber 74 is pressurized by the displacement of valve spool 16, control casing 68 will be displaced to the left when viewing the drawing against the force of simulator spring 80. For further brake application, brake pedal 1 must be depressed further, however, the desired brake pedal travel has been reached. Simulator spring 80 cannot be displaced since actuation surface 86 holds master-cylinder piston 10 firmly against stop 85 of master cylinder 2.

It shall now be assumed that power source 3 has failed. By depression of brake pedal 1, valve spool 16 will move into control casing 68 until it reaches a stop. Upon further pedal actuation, valve spool 16 will move together with control casing 68. Since no fluid is introduced into chamber 74, actuating surface 86 is no longer applied with pressure. Thus, master-cylinder piston 10 is no longer held against stop 85. The pedal force applied by the vehicle operator is transmitted from control casing 68 via simulator spring 80 to master-cylinder piston 10. Pressure is generated in work chamber 12, as is the case in a conventional master cylinder. The pressure in chamber 12 also acts on master-cylinder piston 10', thereby pressurizing work chamber 12'. Thus, it can be stated that in the event of a failure of power source 3, the master cylinder is actuated by means of frictional engagement of master-cylinder pistons 10 and 10' with brake pedal 1. The actuation is, thus, achieved in the same manner as in a conventional tandem master cylinder.

When the brake system is activated without power source 3 pressure being available, antiskid control units 51, 55 and 59 must be disconnected. Otherwise, fluid would be drawn from the brake circuits which could be compensated for only by displacing the master-cylinder pistons 10 and 10'. Following several pressure decreases, brake pedal 1 would then be stepped through completely down to the floorboard of the vehicle, or the master-cylinder pistons 10 and 10' would have moved as far as to the end of master cylinder 2. In this case, the brake would not be operable. To avoid this, the invention provides a hydraulic locking arrangement 64 which includes a housing 90 having a longitudinal bore 91 with two displaceable valve spools 92 and 93 being disposed therein in axial sealed relation. Valve spools 92 and 93 have two end faces 94 and 95 facing one another and two end faces 96 and 97 opposed from one another. The end face 97 confines in longitudinal bore 91 a first pressure chamber 98 into which line 62 terminates. Via line 62, the two antiskid control units 51 and 55 are to discharge the amount of fluid required for obtaining a pressure decrease.

The end face 96 defines in longitudinal bore 91 a second pressure chamber 99 into which line 63 terminates. Line 63 is used by antiskid control unit 59 for discharging the amount of fluid required for obtaining pressure decrease. In longitudinal bore 91, the two end faces 94 and 95 facing each other and valve spools 92 and 93 define a third pressure chamber 100. A line 101 leading to power source 3 terminates in pressure chamber 100. In each of valve spools 92 and 93, a control channel 102 and 103, respectively, is provided which connect the first and second pressure chambers 98 and 99 with a port 104. From port 104, line 65 leads to unpressurized reservoir 29 via lines 66 and 67. Springs 105 and 106 bias valve spools 92 and 93 in the direction of the third pressure chamber.

The hydraulic locking arrangement 64 operates as follows. With power source 3 operative, the third pressure chamber 100 will receive high-pressure fluid from line 101, thereby causing valve spools 92 and 93 to move apart against the force of the springs 105 and 106. In this manner, via channels 102 and 103, a connection between the first and second pressure chambers 98 and 99 and port 104 will be opened. This permits fluid supplied to locking arrangement 64 via lines 62 and 63 to reach reservoir 29 via port 104.

It power source 3 fails, springs 105 and 106 will cause valve spools 92 and 93 to move into the third pressure chamber 100. This interrupts the connection between the first and second pressure chambers 98 and 99 and port 104 so that fluid is not allowed to be discharged by the antiskid control units. The antiskid control units are thus de-activated.

While I have described above the principles of my invention in connection with specific apparatus it is to be clearly understood that this description is made only by way of example and not as a limitation to the scope of my invention as set forth in the objects thereof and in the accompanying claims.

I claim:
1. A full power braking system with an antiskid control comprising:
   a master cylinder including
      a housing having a longitudinal axis,
      a first working chamber disposed in said housing coaxial of said axis,
      a first piston coaxial of said axis slidable in said first working chamber in response to a brake pedal depression;
   a power source coupled to said master cylinder;
   wheel brake cylinders coupled to said first working chamber;
   a pressure-control valve disposed in said master cylinder coaxial of said axis associated with said power source to control fluid from said power source to actuate said wheel brake cylinders from said first working chamber without displacing said first piston;
   an antiskid control system disposed between said first working chamber and said wheel brake cylinders; and
   a device in said master cylinder to interrupt a connection between said first working chamber and said power source when said first piston is displaced in the actuating direction upon failure of said power source.

2. A system according to claim 1, wherein said pressure-control valve connects said power source to said wheel brake cylinders through said first working chamber.

3. A system according to claim 1, wherein said pressure-control valve generates a pressure in a line connecting said wheel brake cylinders with said power source through said first working chamber by throttling the flow of said fluid.

4. A system according to claim 1, wherein said first piston includes
   a sleeve seal disposed at the end of said first piston in said first working chamber engaging the inner surface of said housing,
   another seal between the outer surface of said first piston and the inner surface of said housing from said sleeve seal toward said brake pedal,
   an annular chamber disposed between the outer surface of said first piston and the inner surface of said housing and between said sleeve seal and said another seal, said annular chamber being connected to said power source by said pressure-control valve, and
   a fluid connection between said annular chamber and said first working chamber provided by longitudinal bores spaced from said axis in said first piston and past the outer periphery of said sleeve seal.

5. A system according to claim 4, wherein said master cylinder further includes
a pressure-tight reservoir disposed in said housing adjacent said working chamber,
a bore disposed in said housing connecting said annular chamber to said reservoir, and
a compensating bore disposed in said housing connecting said working chamber to said reservoir.

6. A system according to claim 5, wherein said reservoir is connected to an unpressurized reservoir by said pressure-control valve when said brake system is not activated.

7. A system according to claim 1, wherein said first piston includes
a longitudinal bore coaxial of said axis; and said pressure-control valve includes
a valve spool rigidly connected to said brake pedal and slidaly guided in said longitudinal bore.

8. A system according to claim 1, wherein said first piston includes
a sleeve seal disposed at the end of said first piston in said first working chamber engaging the inner surface of said housing,
another seal between the outer surface of said first piston and the inner surface of said housing spaced from said sleeve seal toward said brake pedal,
an annular chamber disposed between the outer surface of said first piston and the inner surface of said housing and between said sleeve seal and said another seal, and
a fluid connection between said annular chamber and said first working chamber provided by longitudinal bores spaced from said axis in said first piston and past the periphery of said sleeve seal;
said master cylinder further includes
a pressure-tight reservoir disposed in said housing adjacent said first working chamber,
a first bore disposed in said housing connecting said annular chamber to said reservoir, and
a second bore disposed in said housing connecting said first working chamber to said reservoir; and
said pressure-control valve includes
a throttle member connected to said brake pedal; and further including
an unpressurized reservoir; and
a fluid connection between said pressure-tight reservoir and said unpressurized reservoir including
said first bore,
said annular chamber,
a third bore in said first piston connected to said annular chamber,
a longitudinal bore coaxial of said axis in said first piston connected to said third bore,
an outlet port of said longitudinal bore adjacent said throttle member,
a fluid chamber in said housing connected to said outlet port, and
a line connecting said fluid chamber to said unpressurized reservoir;
said throttle member throttling said outlet port upon actuation of said brake pedal to generate pressurized fluid in said first working chamber to actuate said wheel brake cylinders.

9. A system according to claim 1, wherein said pressure-control valve includes
a control casing slidable in said housing in the actuating direction disposed coaxially of said axis between said brake pedal and said first piston in tandem relation with said first piston,
a simulator spring disposed coaxial of said axis between said first piston and said control casing, and
a valve spool rigidly connected to said brake pedal disposed coaxial of said axis within said control casing.

10. A system according to claim 9, wherein said first piston includes
a first sleeve seal disposed at the end of said first piston in said first working chamber engaging the inner surface of said housing,
a first seal between the outer surface of said first piston and the inner surface of said housing spaced from said first sleeve seal toward said brake pedal,
a first annular chamber disposed between the outer surface of said piston and the inner surface of said housing and between said first sleeve seal and said first seal, and
a first fluid connection between said first annular chamber and said first working chamber provided by first longitudinal bores spaced from said axis in said first piston and past the periphery of said first sleeve seal;
further including
a chamber defined by the brake pedal end of said control casing and the brake pedal end of said housing; and
a first longitudinal channel in said housing spaced from said axis to feed pressurized fluid from said power source from said chamber to said first annular chamber under control of said valve spool.

11. A system according to claim 10, further including
a second piston disposed in said housing coaxial of said axis remote from said brake pedal and in tandem ralation with said first piston;
a second working chamber defined by the end of said second piston remote from said first piston and the end of said housing remote from said brake pedal;
said second piston including
a second sleeve seal disposed at the end of said second piston in said second working chamber engaging the inner surface of said housing,
a second seal between the outer surface of said second piston and the inner surface of said housing spaced from said second sleeve seal toward said first piston,
a second annular chamber disposed between the outer surface of said second piston and the inner surface of said housing and between said second sleeve seal and said second seal, and
a second fluid connection between said annular chamber and said second working chamber provided by second longitudianl bores spaced from said axis in said second piston and past the periphery of said sleeve seal; and
a second longitudinal channel in said housing spaced from said axis connected to said first longitudinal channel to feed pressurized fluid from said power source from said chamber to said second annular chamber under control of said valve spool.

12. A system according to claim 11, wherein said first piston is a stepped piston, and said first annular chamber includes
an actuating surface adjacent said brake pedal having a larger diameter than a surface of said first annular chamber adjacent said piston; and further including a stop in the inner surface of said housing adjacent said brake pedal against which said first piston rests.

13. A system according to claim 12, wherein said second piston has a smaller diameter than said first piston and said second piston is secured to said first piston.

14. A system according to claim 13, wherein said antiskid control system includes
at least two antiskid control units, one of said units being connected between said first working chamber and certain ones of said wheel brake cylinders and the other of said units being connected between said second working chamber and others of said wheel brake cylinders, each of said units having a return line to an unpressurized reservoir to remove pressurized fluid from said wheel brake cylinders upon receiving a signal indicating an impending wheel lock; and further including
a hydrualic locking arrangement connected to said power source and in said return lines including two valve spools held in a first position by energy from said valve source against the force of springs each connected to a different one of said two valve spools, said first position permitting pressurized fluid to flow from said units to said unpressurized reservoir, said two valve spools being moved to a second position by said springs upon failure of said power source to block flow from said units to said unpressurized reservoir.

15. A brake system according to claim 1, further including
a hydraulic locking arrangement disposed in return lines from said antiskid control system to an unpressurized reservoir to deactivate said antiskid control system upon failure of said power source.

16. A brake system according to claim 15, wherein said locking arrangement includes
a valve arrangement blocking said return lines upon failure of said power source.

* * * * *